(12) United States Patent
Schmiedel

(10) Patent No.: US 10,930,261 B2
(45) Date of Patent: Feb. 23, 2021

(54) VEHICLE OUTSIDE MICROPHONE UNIT, VEHICLE ACOUSTICAL SYSTEM AND VEHICLE

(71) Applicant: Faurecia Emissions Control Technologies, Germany GmbH, Augsburg (DE)

(72) Inventor: Philipp Schmiedel, Augsburg (DE)

(73) Assignee: Faurecia Emissions Control Technologies, Germany GmbH

( * ) Notice: Subject to any disclaimer, the term of this patent is extended or adjusted under 35 U.S.C. 154(b) by 0 days.

(21) Appl. No.: 16/779,787

(22) Filed: Feb. 3, 2020

(65) Prior Publication Data

US 2020/0251087 A1 Aug. 6, 2020

(30) Foreign Application Priority Data

Feb. 4, 2019 (DE) ..................... 10 2019 102 698.9

(51) Int. Cl.
| | |
|---|---|
| *G10K 11/178* | (2006.01) |
| *B60R 11/02* | (2006.01) |
| *H04R 29/00* | (2006.01) |
| *B60R 11/00* | (2006.01) |

(52) U.S. Cl.
CPC .... *G10K 11/17837* (2018.01); *B60R 11/0217* (2013.01); *B60R 11/0247* (2013.01); *H04R 29/004* (2013.01); *B60R 2011/004* (2013.01); *G10K 2210/1282* (2013.01); *G10K 2210/30231* (2013.01); *H04R 2499/13* (2013.01)

(58) Field of Classification Search
CPC ..... G10K 11/17837; G10K 2210/1282; G10K 2210/30231; B60R 11/0217; B60R 11/0247; B60R 2011/004; H04R 29/004; H04R 2499/13
See application file for complete search history.

(56) References Cited

U.S. PATENT DOCUMENTS

| | | | |
|---|---|---|---|
| 2017/0164095 A1* | 6/2017 | Parkins | H04R 1/086 |
| 2019/0208307 A1* | 7/2019 | Ogut | H04R 1/1016 |
| 2020/0194023 A1* | 6/2020 | Tintor | H04R 5/027 |

* cited by examiner

*Primary Examiner* — Andrew L Sniezek
(74) *Attorney, Agent, or Firm* — Carlson, Gaskey & Olds, P.C.

(57) ABSTRACT

A vehicle outside microphone unit detects noises outside a vehicle and has a sound channel that has an entry opening terminating at a microphone. In an orientation in which the microphone constitutes an uppermost point of the sound channel, a sound channel makes a bend upwards, starting from the entry opening, and is generally configured as a water drain. Further, a vehicle acoustical system having such a vehicle outside microphone unit and a vehicle having a corresponding vehicle acoustical system are described.

18 Claims, 1 Drawing Sheet

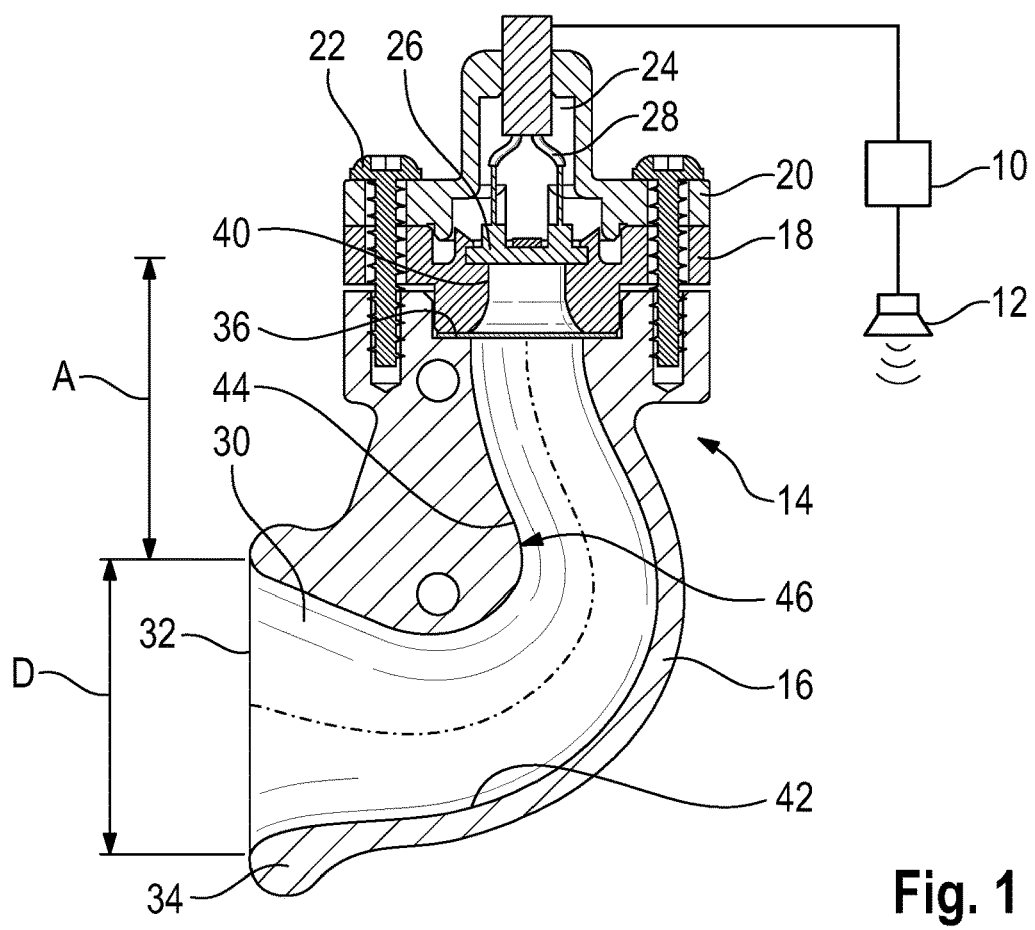
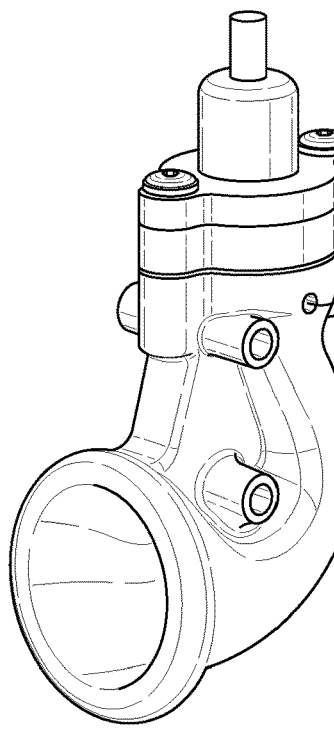
Fig. 2
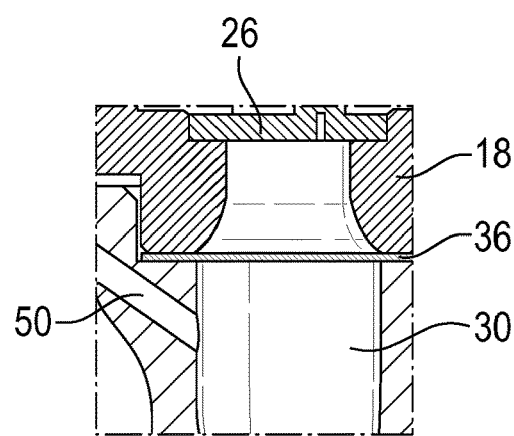
Fig. 3
Fig. 1

VEHICLE OUTSIDE MICROPHONE UNIT, VEHICLE ACOUSTICAL SYSTEM AND VEHICLE

CROSS-REFERENCE TO RELATED APPLICATIONS

This application is a U.S. non-provisional application claiming the benefit of German Application No. 10 2019 102 698.9, filed on Feb. 4, 2019, which is incorporated herein by its entirety.

TECHNICAL FIELD

The invention relates to a vehicle outside microphone unit to detect noises outside a vehicle, and which includes a sound channel that has an entry opening and terminates at a microphone.

BACKGROUND

Vehicle outside microphone units are used to perform active noise control, for example. This means that either a sonic image of an internal combustion engine is altered using loudspeakers, or the sound emission is reduced by an anti-noise, i.e. the vehicle becomes quieter. Furthermore, there are ideas to reduce external noise inside the passenger compartment using loudspeakers as well as, again by anti-noise.

These vehicle outside microphone units comprise, for example, a sound channel that is closed by a membrane at its entry opening to protect the sound channel from water, ice or dirt.

It is important here, however, that when such measures are taken, the incoming sound still remains authentic, which the microphone can then sense. The microphone itself is usually a prefabricated unit, i.e. a supplied part, which is received as a whole in a housing to which the sound channel is adjacent. This is also, an exemplary feature of the present disclosure which will be explained below.

SUMMARY

A vehicle outside microphone unit is provided which is of a simple structure, permits excellent sound conduction via the sound channel to the microphone and, in addition, is insensitive to external influences.

This is achieved in a vehicle outside microphone unit of the type initially mentioned in that, in an orientation of the vehicle outside microphone unit in which the microphone constitutes the vertically highest point of the sound channel, the sound channel makes a bend starting from the at least partly, in particular completely, vertically oriented entry opening and extends upwards towards the microphone and forms a water drainage channel over its entire extent.

Consequently, the entry opening is not directed vertically downwards, but is usually installed in the vehicle in such a way that it is oriented largely or completely vertically and is thus open in this direction. Owing to the bend in the sound channel, the microphone, which is located at the highest point, is protected against the ingress of water, ice, or dirt particles. Due to the shape of the sound channel, which forms a water drainage channel over its extent, it is excluded that water entering via the entry opening can accumulate anywhere in the sound channel, provided, of course, that the orientation of the vehicle outside microphone unit is accordingly such that the microphone constitutes the uppermost point of the sound channel. There are no undercuts or depressions in which water could collect.

For further protection of the microphone, a protective membrane may extend in the sound channel transversely across the sound channel, the protective membrane being air-permeable, water-impermeable and highly sound-permeable. Such membranes are in particular textile membranes.

The above-mentioned air supply opening is e.g. positioned below the membrane. This protective membrane is provided in a vertical section of the sound channel, more specifically just below the microphone, and passes through the sound channel, as mentioned, transversely to the longitudinal extent over the entire cross-sectional area thereof. In case the membrane is made from an air-impermeable material, one or more equalizing ports may be provided to ensure a pressure compensation between the volume in front of and the volume after the membrane. However, the opening or openings are small enough to prevent any ingress of water towards the microphone.

The sound channel extends as a water drain up to the protective membrane. If no protective membrane is provided, the sound channel extends without hindrance as far as the microphone and is generally shaped as a water drain.

The sound channel may have a continuously decreasing cross-section at least up to the membrane, e.g. up to the microphone. Up to the membrane, or even as far as the microphone, the sound channel has no section that has a jump in cross section or a cylindrical section.

The bend extends over at least 80°, all this in relation to the centerline of the sound channel.

The bend may form an S-shape, here too in relation to the centerline of the sound channel. The S-shape provides even greater protection against the ingress of water and the ingress of stones or the like, so that they cannot reach the microphone when they have passed the entry opening.

The inner side of the bend, that is, the wall section that has a smaller radius, may have a curved projection that protrudes into the sound channel to constrict it. This, too, serves to increase protection against water ingress or ingress of stones.

The entry opening may be oriented vertically, i.e. oriented purely vertically, if the vehicle outside microphone unit is oriented such that the microphone constitutes the highest point. The microphone may be oriented horizontally here, more precisely the microphone diaphragm.

The vertical extent of the sound channel after the bend should be so large that there is no direct linear connection between the entry opening and the microphone. This means that when looking into the entry opening, no matter from which angle, it will not be possible to see the microphone. This again serves to increase protection against water ingress up to the microphone or against contact of stones with the microphone.

The same purpose is served by the variant in which the vertical extent of the sound channel above the entry opening corresponds to at least 75% of the diameter of the entry opening. "Above the entry opening" means above the highest point of the entry opening.

If water has entered the sound channel, for example when driving through a river by means of an SUV, the drainage of the water then located in the sound channel is simplified by providing an air supply opening. This air supply opening extends laterally from the sound channel, more specifically adjacent to the microphone or the protective membrane, into the environment.

The microphone itself can be a prefabricated, self-contained unit that is accommodated between housing parts, with a lower housing part including the sound channel. This makes it possible to use only few parts for the vehicle outside microphone unit according to the disclosure.

The sound channel is produced, e.g., by a generative manufacturing method, e.g. from plastics. It thus forms a housing part.

In order to reduce or even to avoid a noise formation at the entry opening, it is defined by a closed circumferential edge, which is directed to the open air and is exclusively arc-shaped in cross-section. No whistling noises or the like can occur here, since the circumferential edge is exposed to the airstream.

In another exemplary embodiment, a vehicle acoustical system includes at least one loudspeaker, a vehicle microphone unit according to the disclosure and a controller which connects the loudspeaker and the microphone unit and drives the loudspeaker as a function of the sound detected.

In one example, the vehicle microphone unit of the vehicle acoustical system can be provided with a singular microphone and is the only microphone unit of the vehicle acoustical system through which sound is detected. Thus, rather than a plurality of vehicle outside microphone units, only a singular one is provided, since the vehicle microphone unit according to the disclosure has very good recording characteristics.

BRIEF DESCRIPTION OF THE DRAWINGS

Further features and advantages of the invention will be apparent from the description below and from the accompanying drawings, to which reference is made and in which:

FIG. 1 shows a longitudinal sectional view of a vehicle outside microphone unit according to the invention of a vehicle acoustical system according to the invention, also illustrated;

FIG. 2 shows a perspective side view of the vehicle outside microphone unit according to the invention; and FIG. 3 shows a detailed sectional view of the vehicle outside microphone unit as shown in FIG. 1 in the area of a protective membrane.

DETAILED DESCRIPTION

FIG. 1 shows a vehicle acoustical system including a controller 10, a loudspeaker 12 which is connected to the controller 10, and a vehicle outside microphone unit 14, which is installed in the vehicle in the position shown and projects into the open air.

The vehicle outside microphone unit 14 serves to pick up noises outside the vehicle, in particular noises emitted by the vehicle itself, in order, for example, to then emit appropriate anti-sound waves via the loudspeaker 12 or a plurality of loudspeakers via the controller, or to generate a modified background noise, whether in the interior of or outside the vehicle.

The vehicle outside microphone unit 14 has a lower housing part 16, a middle housing part 18, which rests on a top side of the housing part 16, and an upper housing part 20, all of which are coupled to each other with fasteners 22.

A microphone 26, which constitutes a prefabricated, self-contained component, is seated in a cavity 24, which is formed by the middle and upper housing parts 18, 20. The signals picked up by the microphone 26 are then routed to the controller 10 via lines 28.

A sound channel 30 having a special configuration is formed in the lower housing part 16 and partly in the middle housing part 18 as well. In the position shown, in which the vehicle outside microphone unit is installed in the vehicle, the microphone 26, which is more particularly located horizontally with its membrane, is the highest point of the sound channel 30. The entry and thus the lowest point of the sound channel 30 is an entry opening 32, which is delimited by an edge 34 which is directed into the open air, is exclusively arcuate in cross-section, is circumferentially closed and thus bead-shaped.

The sound channel 30 extends from this purely vertically oriented entry opening 32 as far as the microphone 26 and, in doing so, extends in an arc shape bent over at least 80°, here bent over more than 90°.

In particular, the bend, visible via the central axis of the sound channel, even runs upward in an S-shape.

A protective membrane 36, which is made from a sound-permeable and air-permeable but water-impermeable material, is provided on the top side of the lower housing part 16, between this and the middle housing part 18.

The sound channel 30 has an increasingly and, more specifically, continuously decreasing cross-section at least up to the protective membrane 36, preferably up to the microphone 26.

At most in the region of the transition between the lower housing part 16 and the middle housing part 18 there may be a slight kink in the sound channel 30 for a better clamping of the membrane 36. In addition, in an uppermost section 40, immediately adjacent to the microphone 26, a short linear, i.e. also cylindrical section may be present, the axial length of which, however, is shorter than the diameter of the sound channel in this area. All in all, this cross-sectional profile does not result in any resonances.

The curved shape of the sound channel 30 is special because it is designed such that a continuous water drain is formed through the sound channel from the protective membrane 36 to the entry opening 32, i.e. no depressions or undercuts are provided in which water could be retained. The lower, trough-shaped section 42 of the sound channel 30 also extends steadily downwards, as can be clearly seen in FIG. 1.

Moreover, there is no straight line starting from the entry opening 32 either, which would reach as far as the microphone or else the membrane and would extend exclusively in the sound channel 30.

To further protect the membrane 36 and the microphone 26, the sound channel has a curved projection 44, which is located on the inner side 46 of the bend.

The sound channel 30 has an extent A above the entry opening 32 which corresponds to at least 75% of the diameter of the entry opening.

It can be seen in FIG. 3 that the vehicle outside microphone unit 14 constitutes a very closed unit.

Since it is possible, in particular in the case of off-road vehicles, that when traveling through water, water may enter the sound channel 30 and would then be retained therein, an air supply opening 50 that leads into the open air is provided immediately below the protective membrane 36 and leads obliquely downwards into the sound channel 30 as shown in FIG. 3, preventing a negative pressure in this upper region of the sound channel 30, as a result of which the continuous drainage of water is ensured.

The vehicle acoustical system illustrated has only one single vehicle outside microphone unit having only one single microphone 26; this is all that is required to pick up the sound. In particular, one or more loudspeakers 12 is/are present in the outside area of the vehicle, in the exhaust sound system and/or in the vehicle interior area.

The lower housing part 16 is preferably manufactured using a generative manufacturing method, in particular from a plastic material. It may possibly also be an injection-molded part and may also have an elastomeric outer skin or be generally made of an elastomeric material.

Although an embodiment has been disclosed, a worker of ordinary skill in this art would recognize that certain modifications would come within the scope of this disclosure. For that reason, the following claims should be studied to determine the true scope and content of this disclosure.

The invention claimed is:

1. A vehicle outside microphone unit for detecting noises outside a vehicle, comprising:
a sound channel which has an entry opening that is at least partly vertically oriented and terminates at a microphone, wherein in an orientation of the vehicle outside microphone unit in which the microphone constitutes a vertically highest point of the sound channel, the sound channel makes a bend starting from the entry opening and extends upwards towards the microphone and forms a water drain over an entire extent of the sound channel, and wherein in a vertical section of the sound channel in front of the microphone, a sound and air permeable protective membrane passes transversely through the sound channel.

2. The vehicle outside microphone unit according to claim 1, wherein the sound channel has a continuously decreasing cross-section from the entry opening up to the microphone and/or up to the sound-permeable and air-permeable protective membrane.

3. The vehicle outside microphone unit according to claim 1, wherein the bend extends over at least 80°.

4. The vehicle outside microphone unit according to claim 1, wherein the bend forms an S-shape.

5. The vehicle outside microphone unit according to claim 1, wherein the bend has an inner side, and a curved projection on the inner side protrudes into the sound channel and narrows the sound channel.

6. The vehicle outside microphone unit according to claim 1, wherein the entry opening is oriented vertically and/or the microphone is oriented horizontally when the microphone constitutes the vertically highest point of the sound channel.

7. The vehicle outside microphone unit according to claim 1, wherein a vertical extent of the sound channel after the bend is so large that there is no direct linear connection between the entry opening and the microphone.

8. The vehicle outside microphone unit according to claim 1, wherein a vertical extent of the sound channel above the entry opening corresponds to at least 75% of the diameter of the entry opening.

9. The vehicle outside microphone unit according to claim 1, wherein a lateral air supply opening leads from an external environment into the sound channel as far as adjacent to the microphone or the sound-permeable and air-permeable protective membrane.

10. The vehicle outside microphone unit according to claim 1, wherein the sound channel is manufactured by a generative manufacturing method and forms a housing part.

11. The vehicle outside microphone unit according to claim 10, wherein the sound channel is manufactured from plastics.

12. The vehicle outside microphone unit according to claim 1, wherein the entry opening is defined by a closed circumferential edge which is directed to open air and is exclusively arc-shaped in cross-section.

13. The vehicle outside microphone unit according to claim 1, including a lower housing part, a middle housing part that rests on a top side of the lower housing part, and an upper housing part that rests on a top side of the middle housing part, and wherein the microphone is seated in a cavity that is formed by the middle and upper housing parts.

14. The vehicle outside microphone unit according to claim 13, wherein the sound channel is formed in the lower housing part and partly in the middle housing part.

15. The vehicle outside microphone unit according to claim 14, wherein the middle housing part is sandwiched between the upper and lower housing parts, and wherein the upper, middle, and lower housing parts are coupled to each other with fasteners.

16. A vehicle acoustical system comprising:
at least one loudspeaker;
a vehicle outside microphone unit to detect noises outside a vehicle, comprising a sound channel which has an entry opening that is at least partly vertically oriented and terminates at a microphone, wherein in an orientation of the vehicle outside microphone unit in which the microphone constitutes a vertically highest point of the sound channel, the sound channel makes a bend starting from the entry opening and extends upwards towards the microphone and forms a water drain over an entire extent of the sound channel; and
a controller which connects the vehicle outside microphone unit and the at least one loudspeaker and drives the at least one loudspeaker as a function of detected sound.

17. The vehicle acoustical system according to claim 16, wherein the microphone is a singular microphone and wherein the vehicle microphone unit with the singular microphone is the only vehicle outside microphone unit of the vehicle acoustical system via which sound is detected.

18. A vehicle outside microphone unit for detecting the noises outside a vehicle, comprising:
a sound channel which has an entry opening that is at least partly vertically oriented and terminates at a microphone, wherein in an orientation of the vehicle outside microphone unit in which a microphone constitutes the vertically highest point of the sound channel, the sound channel makes a bend starting from the at least partly vertically oriented entry opening and extends upwards towards the microphone and forms a water drain over an entire extent of the sound channel, wherein the sound channel is manufactured by a generative manufacturing method and forms a housing part.

* * * * *